(12) United States Patent
Nakajima

(10) Patent No.: US 8,928,942 B2
(45) Date of Patent: Jan. 6, 2015

(54) IMAGE FORMING DEVICE, DENSITY CORRECTION METHOD, AND NON-TRANSITORY COMPUTER READABLE STORAGE MEDIUM STORING PROGRAM

(71) Applicant: Takehiro Nakajima, Tokyo (JP)

(72) Inventor: Takehiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/138,243

(22) Filed: Dec. 23, 2013

(65) Prior Publication Data
US 2014/0253930 A1 Sep. 11, 2014

(30) Foreign Application Priority Data

Mar. 11, 2013 (JP) ................................. 2013-048227

(51) Int. Cl.
*H04N 1/60* (2006.01)
*G06K 15/02* (2006.01)
*G06F 15/00* (2006.01)

(52) U.S. Cl.
CPC .................................. *G06K 15/027* (2013.01)
USPC ............ 358/1.9; 358/518; 358/3.06; 358/3.1; 358/3.3; 399/49; 399/72; 347/14

(58) Field of Classification Search
None
See application file for complete search history.

(56) References Cited

U.S. PATENT DOCUMENTS

2005/0280852 A1* 12/2005 Namizuka ...................... 358/1.9
2013/0050324 A1*  2/2013 Uchida ............................ 347/14

FOREIGN PATENT DOCUMENTS

JP     08-032807     2/1996
JP       4383622    12/2009

* cited by examiner

*Primary Examiner* — Quang N Vo
(74) *Attorney, Agent, or Firm* — Cooper & Dunham LLP

(57) ABSTRACT

An image forming device includes a density correction unit that corrects density based on a density detection value of the density correction pattern; a first density correction pattern generating unit that generates a first density correction pattern having low resolution; and a second density correction pattern generating unit that generates a second density correction pattern having high resolution. When a first density detection value of the first density correction pattern is greater than a predetermined threshold value, the density correction unit corrects the density by determining a density correction reflection rate, based on the first density detection value. When the first density detection value is less than or equal to the predetermined threshold value, the density correction unit corrects the density by determining the density correction reflection rate, based on a second density detection value of the second density correction pattern.

8 Claims, 6 Drawing Sheets

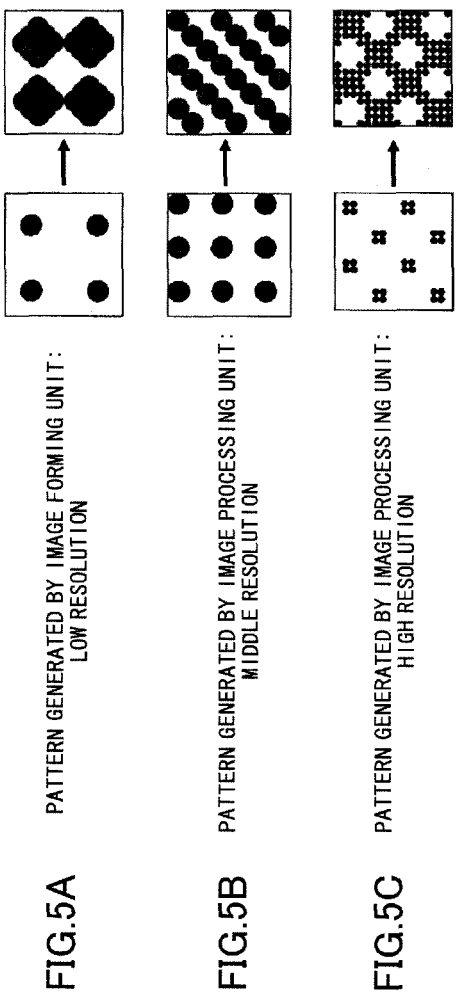

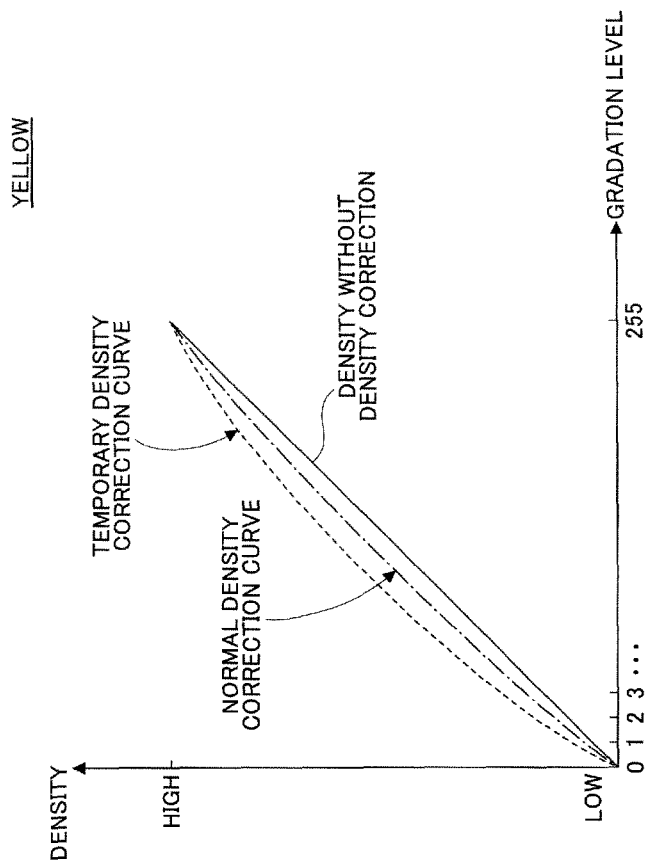

IMAGE FORMING DEVICE, DENSITY CORRECTION METHOD, AND NON-TRANSITORY COMPUTER READABLE STORAGE MEDIUM STORING PROGRAM

BACKGROUND OF THE INVENTION

1. Field of the Invention

The present invention relates to an image forming device such as a digital color copy machine or a pr a density correction method, and a non-transitory computer readable storage medium storing a program. Particularly, the present invention relates to a technique for correcting print density.

2. Description of the Related Art

For printing using an image forming device, in some cases, a problem is variation in print density due to individual difference, or due to time-dependent deterioration of an individual device. For such a problem, a technique has been known such that a density correction pattern is formed on an image carrier, such as a photoreceptor or an intermediate transfer belt; the density correction pattern is read by a density sensor of a device; and density correction is executed by using the read density value.

For example, Patent Document 1 (Japanese Patent No. 4383622) discloses the following technique. First, a gradation pattern for density correction is printed on a paper sheet by using a printer. A density correction table is created by reading the gradation pattern by using a scanner. Subsequently, patches are formed on an image carrier. The number of the patches is the same as levels of the density, which is corrected by using the scanner. The patches formed on the image carrier are read by an internal sensor. Then, a density correction table 1 is created by correcting the previous density correction table. Further, patches are formed on the image carrier. Here, the number of the patches is greater than the levels of the density, which is corrected by using the scanner. The patches formed on the image carrier are read by the internal sensor, and thereby a density correction table 2 is created. According to the technique disclosed in Patent Document 1, the density correction table 1 and the density correction table 2 are used, while they are switched with each other.

However, in an image forming device according to related art, detection accuracy is not necessarily good. When the detection accuracy does not match the density stabilizing performance of the device, excessive correction or a level difference in gradation occurs. Patent Document 1 does not consider such a problem.

SUMMARY OF THE INVENTION

For an image forming device that includes a function to correct density by reading a density correction pattern by an internal sensor, which density correction pattern is formed on an image carrier, it is desirable to reduce excessive correction or a level difference in gradation due to detection accuracy of the internal sensor.

According to an aspect of the present invention, there is provided an image forming device including an image forming unit configured to form a density correction pattern on an image carrier; a detection unit configured to detect density of the density correction pattern formed on the image carrier; a density correction unit configured to correct the density based on a density detection value of the density correction pattern; a first density correction pattern generating unit configured to generate a first density correction pattern having resolution which is lower than that of a pattern used for actual image printing; a second density correction pattern generating unit configured to generate a second density correction pattern having high resolution, wherein the second density correction pattern is used for actual image printing; and a determination unit configured to compare a density detection value of the density correction pattern with a predetermined threshold value. When a first density detection value of the first density correction pattern is greater than the predetermined threshold value, the density correction unit corrects the density by determining a density correction reflection rate, based on the first density detection value of the first density correction pattern. When the first density detection value is less than or equal to the predetermined threshold value, the density correction unit corrects the density by determining the density correction reflection rate, based on a second density detection value of the second density correction pattern.

According to another aspect of the present invention, there is provided a density correction method executed by an image forming device. The density correction method includes generating a first density correction pattern having resolution which is lower than that of a pattern which is to be used for actual image printing; generating a second density correction pattern having high resolution, wherein the second density correction pattern is used for actual image printing; forming one of the first density correction pattern and the second density correction pattern on an image carrier; detecting density of the one of the first density correction pattern and the second density correction pattern, wherein the one of the first density correction pattern and the second density correction pattern is formed on the image carrier; and comparing a first density detection value of the first density correction pattern with a predetermined threshold value. When the first density detection value is greater than the predetermined threshold value, the density is corrected by determining a density correction reflection rate, based on the first density detection value. When the first density detection value is less than or equal to the predetermined threshold value, the density is corrected by determining the density correction reflection rate, based on a second density detection value of the second density correction pattern.

According to another aspect of the present invention, there is provided a non-transitory computer readable storage medium storing a program that causes a computer to execute a density correction method. The density correction method includes generating a first density correction pattern having resolution which is lower than that of a pattern which is to be used for actual image printing; generating a second density correction pattern having high resolution, wherein the second density correction pattern is used for actual image printing; forming one of the first density correction pattern and the second density correction pattern on an image carrier; detecting density of the one of the first density correction pattern and the second density correction pattern, wherein the one of the first density correction pattern and the second density correction pattern is formed on the image carrier; and comparing a first density detection value of the first density correction pattern with a predetermined threshold value. When the first density detection value is greater than the predetermined threshold value, the density is corrected by determining a density correction reflection rate, based on the first density detection value. When the first density detection value is less than or equal to the predetermined threshold value, the density is corrected by determining the density correction reflection rate, based on a second density detection value of the second density correction pattern.

According to an embodiment of the present invention, excessive correction or a level difference during density correction can be reduced by switching a density correction pattern, which is used during density correction, depending on density stabilizing performance of a device.

Other objects, features and advantages of the present invention will become more apparent from the following detailed description when read in conjunction with the accompanying drawings.

BRIEF DESCRIPTION OF THE DRAWINGS

FIGS. 5A, 5B, and 5C are diagrams showing specific examples of density correction patterns; and FIG. 6 is a diagram showing an example of a density correction curve.

DETAILED DESCRIPTION OF THE PREFERRED EMBODIMENTS

Hereinafter, an embodiment of the present invention is explained by referring to the accompanying drawings.

Figure 1:
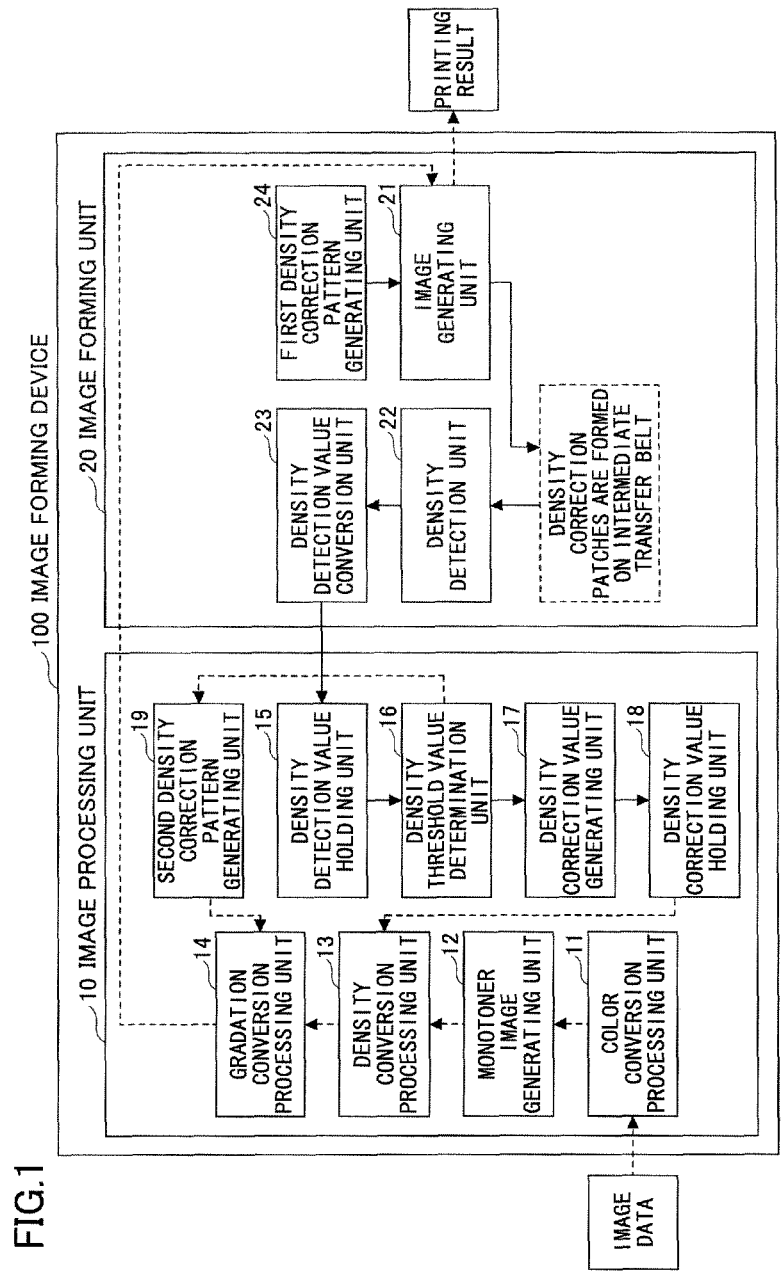
FIG. 1 is a functional block diagram of an image forming device according to an embodiment of the present invention.

FIG. 1 is a block diagram showing an example of a configuration of an image forming device 100 according to the embodiment of the present invention. The image forming device 100 is roughly classified into an image processing unit 10 and an image forming unit 20. The image forming device 100 includes an image reading unit (scanner), an operations panel, and the like. However, explanations of these units are omitted here. In addition, for example, a personal computer can be connected to the image forming device 100. However, the explanation is omitted in FIG. 1.

The image processing unit 10 includes, for example, a color conversion processing unit 11; a monotone image generating unit 12; a density conversion processing unit 13; a gradation conversion processing unit 14; a density detection value holding unit 15; a density threshold value determination unit 16; a density correction value generating unit 17; a density correction value holding unit 18; and a second density correction pattern generating unit 19.

The image forming unit 20 includes, for example, an image generating unit 21; a density detection unit 22; a density detection value conversion unit 23; and a first density correction pattern generating unit 24. The image generating unit 21 is a generic term of all mechanical parts of, for example, a tandem color printer. The image generating unit 21 includes an intermediate transfer belt as an image carrier. A plurality of density sensors (internal sensors) is disposed in a main scanning direction of the intermediate transfer belt. The density detection unit 22 is a generic term of these sensors.

Figure 2:
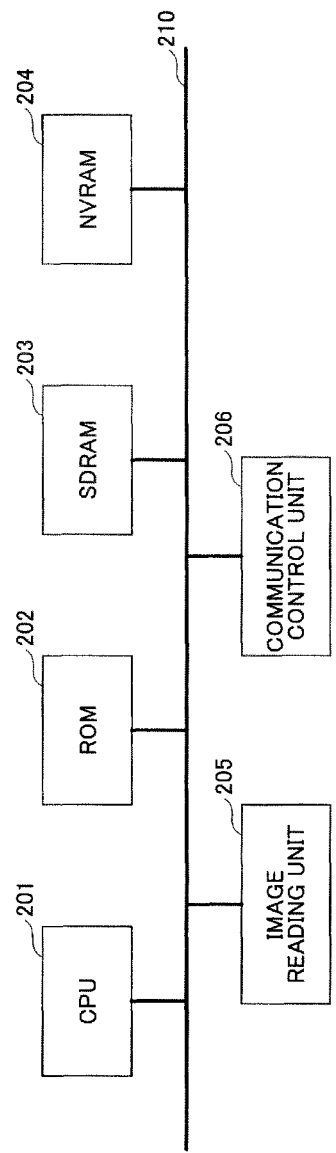
FIG. 2 is a hardware configuration diagram of an image processing unit of FIG. 1.

FIG. 2 shows an example of a hardware configuration of the image processing unit 10. The image processing unit 10 includes, for example, a CPU 201; a ROM 202; an SDRAM 203; an NVRAM 204; an image reading unit 205; a communication control unit 206; and a bus 210. The CPU 201 executes various types of processes. The ROM 202 stores various types of programs which may be required for the processes of the CPU 201. The SDRAM 203 temporarily stores data, image data, or the like under processing by the CPU 201. The NVRAM 204 is a nonvolatile memory. The NVRAM 204 stores various types of parameters and tables, for example. The image reading unit 205 is a scanner unit. The communication control unit 206 can establish a connection with a personal computer through a local area network (LAN), for example. The CPU 201, the ROM 202, the SDRAM 203, the NVRAM 204, the image reading unit 205, and the communication control unit 206 are connected through the bus 210.

By interaction among some programs stored in the CPU 201 and the ROM 202, the function of each of the units included in the image processing unit 10 of FIG. 1 can be achieved, except for the density detection value holding unit 15 and the density correction value holding unit 18. The SDRAM 203 supports the density detection value holding unit 15. The NVRAM 204 supports the density correction value holding unit 18.

Since a hardware configuration of the image forming unit 20 is basically the same as that of the image processing device 10, depiction of the hardware configuration of the image forming unit 20 is omitted. Here, the image processing unit 10 and the image forming unit 20 may be integrally formed by connecting the image generating unit 21, the density detection unit 22, the operations panel, and the like to the bus 210.

Referring to FIG. 1, during normal printing, the color conversion processing unit 11; the monotone image generating unit 12; the density conversion processing unit 13; and the gradation conversion processing unit 14 apply corresponding predetermined processes to image data, which is input from a personal computer or the image reading unit, for example. First, the color conversion processing unit 11 executes color conversion processing (e.g., conversion of RGB data into CYM data). Subsequently, the monotone image generating unit 12 executes a monotone image generating process. After that, in the density conversion processing unit 13, density conversion processing is executed based on density correction tables, which are held as density correction values (or density correction curves) in the density correction value holding unit 18. The density correction value holding unit 18 holds, for each of color versions, the corresponding density correction table. Additionally, the density correction value holding unit 18 holds a history value and a density correction reflection rate of a density detection value (which is explained later). Subsequently, the gradation conversion processing unit 14 applies gradation conversion processing to the density converted image data.

The gradation converted image data (CMYK) is transmitted to the image generating unit 21 of the image forming unit 20. The image generating unit 21 generates a full-color image of the image data, which is transmitted from the image processing unit 10. Here, the image generating unit 21 generates the full-color image of the image data by superposing toner images in black (K), cyan (C), magenta (M), and yellow (Y), respectively. The image generating unit 21 discharges a recording paper sheet, which is the printing result.

<Density Correction Process>

Hereinafter, an example of a density correction process is explained. In the following explanation, the density correction process (creation of a density correction table) is executed for each of colors of black, cyan, magenta, and yellow. For each color, the density correction process is executed for each of gradation levels. FIG. 6 shows an example of a density correction curve, which is obtained as a result of executing the density correction process for yellow.

For convenience of the explanation, in the following explanation, the density correction process is explained for a particular color and for a particular gradation level. However, in general, such a density correction process is executed for each of the colors of black, cyan, magenta, and yellow, and for each of the gradation levels. Accordingly, for each of the colors, the density correction curve such as shown in FIG. 6 is obtained.

In the density correction process (generation of the density correction tables), a first density correction pattern is generated depending on a specific execution condition of the image forming unit 20. Here, the first density correction pattern may be generated by a user by specifying a particular density correction pattern through the operations panel, which is included in the image forming device 100.

The first density correction pattern is generated by the first density correction pattern generating unit 24 included in the image forming unit 20. The image generating unit 21 forms an image of the first density correction pattern, which is generated by the first density correction pattern generating unit 24, on the intermediate transfer belt as the image carrier. Density of the first density correction pattern (patches for density correction), which is formed on the intermediate transfer belt, is detected (read) by the density detection unit 22. Here, reading of the density is exemplified. However, as a characteristic to be read, some characteristics corresponding to brightness may be utilized. After reading the first density correction pattern, the density detection value conversion unit 23 converts the read data into a value (a first density detection value) which can be processed by the image processing unit 10. Then, the density detection value conversion unit 23 transmits the first density detection value to the image processing unit 10.

The image processing unit 10 temporarily stores the first density detection value, which is transmitted from the image forming unit 20, in the density detection value holding unit 15. After determining validity of the first density detection value stored in the density detection value holding unit 15, the density threshold value determining unit 16 executes a threshold value determination. When the density threshold value determining unit 16 determines that the first density detection value is greater than a predetermined threshold value, the density threshold value determining unit 16 activates the density correction value generating unit 17.

When the first density detection value stored in the density detection value holding unit 15 is less than or equal to the predetermined threshold value, the density threshold value determining unit 16 activates the second density correction pattern generating unit 19, which is included in the image processing unit 10.

The gradation conversion processing unit 14 applies gradation conversion to a second density correction pattern which is generated by the second density correction pattern generating unit 19. Subsequently, the gradation-converted second density correction pattern is transmitted to the image forming unit 20.

The image generating unit 21 of the image forming unit 20, again, forms an image of the second density correction pattern, which is transmitted from the image processing unit 10, on the intermediate transfer belt. The density detection unit 22, again, reads density of the second density correction pattern (patches for density correction), which is formed on the intermediate transfer belt. The density detection value conversion unit 23 converts the density into a second density detection value, which can be processed by the image processing unit 10. Then, the density detection value conversion unit 23 transmits the second density detection value to the image processing unit 10.

The image processing unit 10 temporarily stores the second density detection value transmitted from the image forming unit 20 in the density detection value holding unit 15. After determining validity of the second density detection value stored in the density detection value holding unit 15, the density threshold value determination unit 16 activates the density correction value generating unit 17.

The density correction value generating unit 17 generates a density correction value (density correction table) by using a density detection value stored in the density detection value holding unit 15. When the first density detection value of the first density correction pattern generated by the first density correction pattern generating unit 24 of the image forming unit 20 is greater than the predetermined threshold value, the density correction value generating unit 17 generates the density correction value (density correction table) by using the first density detection value. When the first density detection value is less than or equal to the predetermined threshold value, the density correction value generating unit 17 generates the density correction value (density correction table) by using the second density detection value of the second density correction pattern, which is generated by the second density correction pattern generating unit 19 of the image processing device 10.

The density correction value (density correction table) generated by the density correction value generating unit 17 is stored in the density correction value holding unit 18. The density correction value (density correction table) stored in the density correction value holding unit 18 is reflected in subsequent density conversion processing of the image data by the density conversion processing unit 13.

The first density correction pattern of the first density correction pattern generating unit 24 of the image forming unit 20 is assumed to be different from the second density correction pattern of the second density correction pattern generating unit 19 of the image processing unit 10. The first density correction pattern of the first density correction pattern generating unit 24 of the image forming unit 20 is a pattern having resolution, which is lower than resolution of a pattern to be used for actual image printing. As the first density correction pattern of the first density correction pattern generating unit 24, a dot arrangement pattern having high density stability, which includes stability against time-dependent deterioration, is utilized. By using the dot arrangement pattern having high stability, a determination can be made as to whether to execute a higher-precision gradation correction, and excessive correction and a level difference in gradation can be reduced. The second density correction pattern of the second density correction pattern generating unit 19 of the image processing unit 10 is a pattern having high resolution. Here, the pattern having high resolution is to be used for actual image printing. By using the dot arrangement pattern suitable for actual image printing, detailed density correction can be executed. Specific examples of these density correction patterns are explained later.

Figure 3:
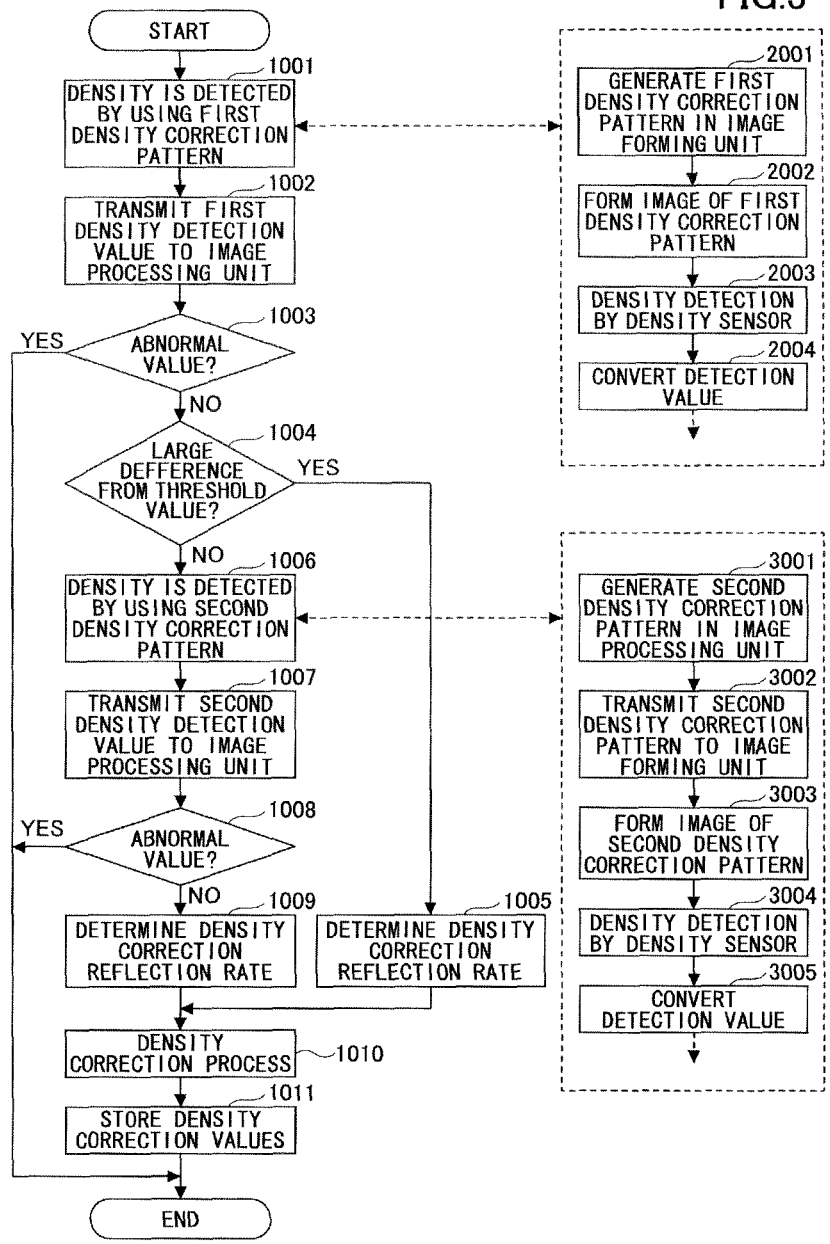
FIG. 3 is a flowchart of a density correction process according to the embodiment of the present invention.

Hereinafter, the density correction process according to the embodiment is explained in detail by referring to the flowchart, which is shown in FIG. 3. FIG. 3 is the flowchart of an example of the density correction process according to the embodiment of the present invention.

The process may be initiated by designation of a user through the operations panel of the image forming device 100, or by an automatic operation of the image forming device 100 under a specific condition. The specific condition of the automatic operation may be a condition of the image forming device 100 immediately after turning on a main power supply of the image forming device 100; a condition of the image forming device 100 immediately after returning from an energy saving mode; a condition of the image forming device 100 immediately after a printing operation or printing; or a condition of the image forming device 100 immediately after replacing a component and/or a unit of the image forming device 100, for example. Additionally, the specific condition may include a condition of the image forming device 100 immediately after printing a predetermined number of pages, or a condition of the image forming device 100 after a predetermined time period has elapsed from a moment at which the main power supply of the image forming device 100 is turned on.

After initiating the density correction process, first, density is detected by using the first density correction pattern, which is generated by the image forming unit 20 (step 1001).

Specifically, the first density correction pattern generating unit 24 of the image forming device 20 generates the first density correction pattern having the resolution, which is lower than that of the pattern to be used for actual image printing (step 2001). Here, the first density correction pattern is generated for each of the colors of black, cyan, magenta, and yellow. The first density correction pattern includes a plurality of patterns corresponding to a predetermined number of gradation levels.

The image generating unit 21 forms the image of the first density correction pattern generated by the first density correction pattern generating unit 24 on the intermediate transfer belt as the image carrier (step 2002). For forming the image of the first density correction pattern (or for forming the image of density correction patches), the image is formed by using black toner only; by using cyan toner only; by using magenta toner only; or by using yellow toner only. In other words, unlike normal printing, the image is not formed by superposing a plurality of color images. Furthermore, a number of the patches included in the first density correction pattern may be the same for the plurality of colors.

Figure 4:
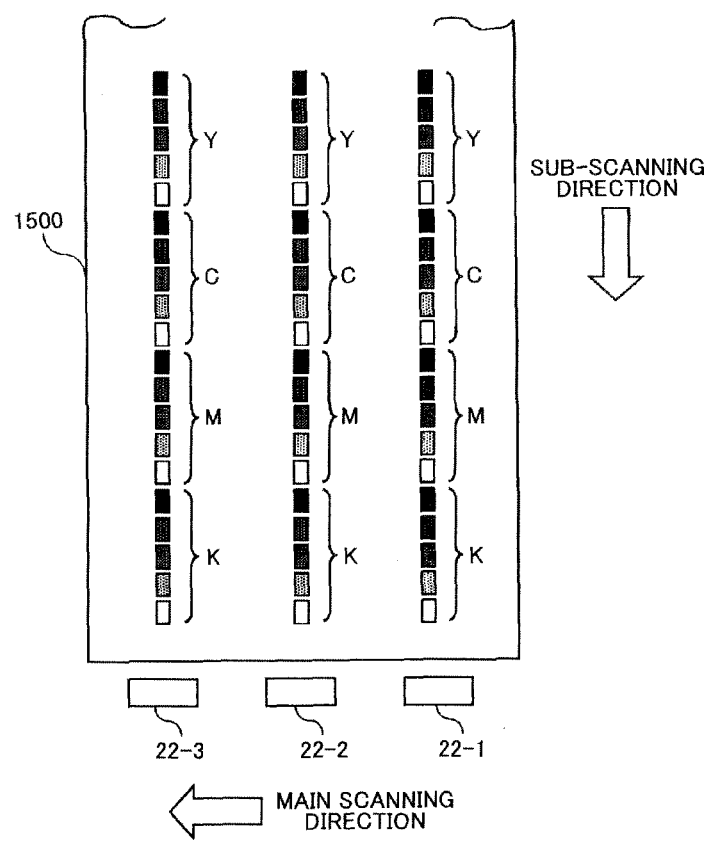
FIG. 4 is a diagram showing a situation in which a density correction pattern is formed on an intermediate transfer belt as an image carrier.

The arrangement and the size of the first density correction pattern depend on a number of density sensors included in the density detection unit 22, and characteristics of the density sensors. Here, it is assumed that a plurality of density sensors is arranged in a main scanning direction of the intermediate transfer belt. FIG. 4 shows a situation in which the density detection unit 22 includes three density sensors 22-1, 22-2, and 22-3, and the first density correction pattern (the density correction patches) is formed on the intermediate transfer belt 1500.

After forming the first density correction pattern on the intermediate transfer belt 1500 by the image generating unit 21, a first density value of the first density correction pattern is detected by the density sensor of the density detection unit 22 (i.e., a density value of each of the patches is detected by the corresponding density sensor) (step 2003). Here, the density value may be thickness or a coating amount. Alternatively, the density value may be lightness L of the L*a*b* color space.

After detecting the density value, the density detection value conversion unit 23 converts the density value into a value which can be processed by the image processing unit 10 (step 2004). For example, when a plurality of patches having the same gradation level is formed for each of the colors (three patches in the example of FIG. 4), the detection results may be averaged.

The image forming unit 20 transmits the first density detection value to the image processing unit 10 (step 1002). Here, the density detection value conversion unit 23 obtains the first density detection value by converting the density value into the value which can be processed by the image processing unit 10.

In the image processing unit 10, the density detection value holding unit 15 temporarily stores the first density detection value, which is transmitted from the image forming unit 20. Namely, the density detection value holding unit 15 stores the first density detection value of the first density correction pattern, which is generated by the first density correction pattern generating unit 24 of the image forming unit 20. The first density correction pattern has the resolution, which is lower than that of a pattern which is used for actual image printing. Actually, for each of the colors of black, cyan, magenta, and yellow, the first density detection value is obtained for each of the gradation levels.

The density threshold value determination unit 16 retrieves the first density detection value from the density detection value holding unit 15, and the density threshold value determination unit 16 determines validity of the first density detection value (step 1003). Determination of the validity of the first density detection value includes, for example, (1) validation of a range of the first density detection value, (2) determination of presence or absence of inversion and/or reversal of the first density detection value, or (3) validation of a range of the first density detection value corresponding to the maximum gradation level. When the first density detection value is determined to be an abnormal value during the determination of the validity of the first density detection value (step 1003 YES), the process is terminated, without executing the density correction process.

When the first density detection value is determined to be a normal value during the determination of the validity of the first density detection value (step 1003 NO), the density threshold value determination unit 16 executes the threshold determination for the first density detection value using the history value (step 1004). Namely, the density threshold value determination unit 16 compares the first density detection value of the first density correction pattern with the history value. The first density correction pattern has the resolution which is lower than that of a pattern, which is generated by the image forming unit 20, and which is to be used for actual image printing. The history value is used as a reference value of the comparison. As the history value, an average value may be used. The average value may be an average value of the first density detection values which have been detected so far. Alternatively, as the history value, the previous first density detection value may be used.

When it is determined by the threshold determination that a difference between the first density detection value and the history value is greater than the predetermined threshold value (step 1004 YES), the density threshold value determination unit 16 sends a processing request to the density correction value generating unit 17.

The density correction value generating unit 17 determines the density correction reflection rate by the first density detection value stored in the density detection value holding unit 15, namely, by the first density detection value of the first density correction pattern having the resolution, which is lower than that of a pattern, which is generated by the image forming unit 20, and which is to be used for actual image printing (step 1005). Then, the density correction value generating unit 17 executes the density correction process (step 1010).

Specifically, the density correction value generating unit 17 generates a temporary density correction curve by using the first density detection value of the first density correction pattern having the resolution, which is lower than that of a pattern, which is generated by the image forming unit 20, and which is to be used for actual image printing. After determining the density correction reflection rate, the density correction value generating unit 17 generates a normal density correction curve (cf. FIG. 6, for example). By adjusting the density correction reflection rate to be greater than or equal to 0 and less than 1, a level difference in gradation can be reduced. Alternatively, the density correction reflection rate may be a fixed value (e.g., 0.5).

Here, the normal density correction curve is calculated by the formula (1) below.

(normal density correction curve)=(density without density correction(which is a straight line))× (1.0−(density correction reflection rate))+(temporary density correction curve)×(density correction reflection rate)　　(1)

The density correction value generating unit 17 stores a result of calculating the normal density correction curve (density correction values) or a density correction table which is generated by the normal density correction curve in the density correction value holding unit 18 (step 1011), and the density correction process is terminated.

When it is determined by the threshold determination at step 1004 that the difference between the first density detection value and the history value is less than or equal to the predetermined threshold value (step 1004 NO), the density detection result by using the first density correction pattern generated by the image forming unit 20 is cancelled, and density is detected by using the second density correction pattern, which is generated by the image processing unit 10 (step 1006).

Specifically, the density threshold value determination unit 16 sends a request for generating a pattern to the second density correction pattern generating unit 19 of the image processing unit 10. The second density correction pattern generating unit 19 generates the second density correction pattern having high resolution, which is used for actual image printing (step 3001). The image of the second density correction pattern (or the image of density correction patches) is formed for each of the colors of black, cyan, magenta, and yellow. For the second density correction pattern, the number of the gradation levels may be the same as that of the first density correction pattern generated by the image forming unit 20.

The gradation conversion processing unit 14 applies gradation conversion to the second density correction pattern generated by the second density correction pattern generating unit 19. After that, the image processing unit 10 transmits the gradation converted second density correction pattern to the image forming unit 20 (step 3002).

In the image forming unit 20, the image generating unit 21 forms an image of the second density correction pattern, which is transmitted from the image processing unit 10, on the intermediate transfer belt 1500 (step 3003). For forming the image of the second density correction pattern (or for forming the image of density correction patches), the image is formed by only using black toner; only by using cyan toner; only by using magenta toner; or only by using yellow toner. Namely, the image is not formed by superposing a plurality of color images. The number of the patches included in the second density correction pattern may be the same as that of the first density correction pattern generated by the image forming unit 20. The density detection unit 22 detects a density value of the second density correction pattern (density values of patches for density correction), which is formed on the intermediate transfer belt 1500 (step 3004). The density detection value conversion unit 23 converts the density value detected by the density detection unit 22 into a value (a second density detection value) which can be processed by the image processing unit 10.

After that, the image forming unit 20 transmits the second density detection value (which is converted by the density detection value conversion unit 23) to the image processing unit 10 (step 1007).

In the image processing unit 10, the density detection value holding unit 15 stores the second density detection value, which is transmitted by the image forming unit 20. The density detection value holding unit 15 cancels the first density detection value stored therein. Namely, the density detection value holding unit 15 stores the second density detection value of the second density correction pattern having the high resolution. Here, the second density correction pattern is generated by the second density correction pattern generating unit 9 of the image processing unit 10, and the second density correction pattern is to be used for actual image printing. Here, for each of the colors of black, cyan, magenta, and yellow, the second density detection value is obtained for each of the gradation levels.

The density threshold value determination unit 16 retrieves the second density detection value from the density detection value holding unit 15, and the density threshold value determination unit 16 determines validity of the second density detection value (step 1008). The process is the same as that of the previous case for the first density detection value of the first density correction pattern, which is generated by the image forming unit 20. When it is determined that the second density detection value is an abnormal value at the validation determination of the second density detection value (step 1008 YES), the process is terminated, without executing the subsequent density correction process.

When the second density detection value is a normal value (step 1008 NO), the density threshold value determination unit 16 sends a processing request to the density correction value generating unit 17. The density correction value generating unit 17 determines the density correction reflection rate by the second density detection value stored in the density detection value holding unit 15, namely, the second density detection value of the second density correction pattern having the high resolution, which is generated by the image processing unit 10, and which is used for actual image printing (step 1009). Then, the density correction value generating unit 17 executes the density correction process (step 1010).

Specifically, the density correction value generating unit 17 generates a temporary density correction curve by the second density detection value of the second density correction pattern having the high resolution, which is generated by the image processing unit 10, and which is used for actual image printing, After determining the density correction reflection rate, the density correction value generating unit 17 generates a normal density correction curve. Here, the normal density correction curve is determined by the formula (1). By adjusting the density correction reflection rate to be greater than or equal to 0 and less than 1, a level difference in gradation can be reduced. The density correction reflection rate may be a fixed value (e.g., 0.75), which is greater than that of the case in which the first density detection value of the first density correction pattern is used. Here, the first density correction pattern is generated by the image forming unit 20.

For a case in which the density correction is executed by using the first density detection value of the first density correction pattern generated by the image forming unit 20, a state may be such that time-dependent fluctuation is large in the image forming device 100. In such a case, if the density correction reflection rate is adjusted to be greater than that of the case in which the second density detection value of the second density correction pattern generated by the image processing unit 10 is used, a difference between the printing result prior to the density correction and the printing result subsequent to the density correction may become large. Thus, in this case, the density correction reflection rate can preferably be a small value (e.g., 0.5). For a case in which the density correction is executed by using the second density detection value of the second density correction pattern generated by the image processing unit 10, a state may be such that time-dependent fluctuation is small in the image forming device 100. In such a case, since a difference between the second density detection value and the history value is small, the density correction reflection rate can preferably be a large value (e.g., 0.75), compared to the case in which the first density detection value of the first density correction pattern generated by the image forming unit 20 is used.

The density correction value generating unit 17 stores the calculation result of the normal density correction curve (density correction values) or a density correction table generated by using the normal density correction curve in the density correction value holding unit 18 (step 1011), and the density correction value generating unit 17 terminates the density correction process.

Here, for the case in which the density correction is executed by using the second density detection value of the second density correction pattern generated by the image processing unit 10, the second density detection value may be compared with the history value, after determining the validity of the second density detection value. In this case, the density correction process may be executed only if the difference between the second density detection value and the history value is greater than a predetermined threshold value.

FIGS. 5A-5C shows specific examples of the first density correction pattern generated by the image forming unit 20 and the second density correction pattern generated by the image processing unit 10.

FIG. 5A shows an example of the first density correction pattern generated by the image forming unit 20 (a pattern generated by the image forming unit 20). The pattern generated by the image forming unit 20 is a pattern having resolution, which is lower than that of a pattern which is used for actual image printing. Namely, a screen line number of the pattern generated by the image forming unit 20 is set to be less than those of the second density correction patterns of FIGS. 5B, and 5C, which have high resolution. Since the pattern generated by the image forming unit 20 may also be used for measuring an adhesion characteristic of a dot by the image forming unit 20, a common dot arrangement may be used, irrespective of the colors. Further, in order to enhance density stability, gradation expression may be executed by using a method in which concentrated dots are grown (a halftone dot shape).

FIGS. 5B and 5C show examples of the second density correction pattern which is generated by the image processing unit 10 (a pattern generated by the image processing unit 10). The pattern generated by the image processing unit 10 is a pattern having high resolution, which can be used for actual image printing. Namely, for the pattern generated by the image processing unit 10, a dot arrangement is utilized, which is used for actual image printing. The screen line number of the pattern generated by the image processing unit 10 is set to be greater than that of the first density correction pattern of FIG. 5A, which has low resolution. When a dither method is used for gradation processing, in actual printing, color unevenness and moire, which depend on a dot arrangement, are reduced for each of the color versions. In the embodiment, a dot arrangement of the pattern generated by the image processing unit 10 may be modified for each of the color versions. When the size of a single dot of the pattern generated by the image processing unit 10 is greater than or equal to that of the first density correction pattern of FIG. 5A, which has the low resolution, dots are grown by arranging dots in accordance with a method of forming lines (a multiple line shape) as shown in FIG. 5B. When the size of a single dot of the pattern generated by the image processing unit 10 is less than that of the first density correction pattern of FIG. 5A, gradation expression is executed by the method in which concentrated dots are grown (a halftone dot shape).

For convenience of explanation, the device according to the embodiment of the present invention is explained by using the functional block diagrams. However, the device may be implemented in hardware, software, or a combination thereof. In particular, the above-described density correction method may be achieved by a program that causes a computer to execute the density correction method. The program may be stored in a non-transitory computer readable storage medium, such as a random access memory (RAM), a flash memory, a read-only memory (ROM), an EPROM, an EEPROM, a register, a hard disk drive (HDD), a removable disk, a CD-ROM, a database, a server, and the like.

Hereinabove, the image forming device, the density correction method, and the non-transitory computer readable storage medium storing the program are explained by the embodiment. However, the present invention is not limited to the specifically disclosed embodiment, and variations and modifications may be made without departing from the scope of the present invention.

The present application is based on and claims the benefit of priority of Japanese Priority Application No. 2013-048227 filed on Mar. 11, 2013, the entire contents of which are hereby incorporated herein by reference.

What is claimed is:

1. An image forming device comprising:
   an image forming unit configured to form a density correction pattern on an image carrier;
   a detection unit configured to detect density of the density correction pattern formed on the image carrier;
   a density correction unit configured to correct the density based on a density detection value of the density correction pattern;
   a first density correction pattern generating unit configured to generate a first density correction pattern having resolution which is lower than that of a pattern used for actual image printing;
   a second density correction pattern generating unit configured to generate a second density correction pattern having high resolution, wherein the second density correction pattern is used for actual image printing; and
   a determination unit configured to compare a density detection value of the density correction pattern with a predetermined threshold value,
   wherein, when a first density detection value of the first density correction pattern is greater than the predetermined threshold value, the density correction unit corrects the density by determining a density correction reflection rate, based on the first density detection value of the first density correction pattern, and
   wherein, when the first density detection value is less than or equal to the predetermined threshold value, the density correction unit corrects the density by determining the density correction reflection rate, based on a second density detection value of the second density correction pattern.

2. The image forming device according to claim 1, wherein the density correction reflection rate which is determined based on the first density detection value is set to be less than the density correction reflection rate which is determined based on the second density detection value.

3. The image forming device according to claim 1, wherein a first dot arrangement of the first density correction pattern is common for each of color versions.

4. The image forming device according to claim 1, wherein a second dot arrangement of the second density correction pattern depends on a color.

5. The image forming device according to claim 3, wherein the first dot arrangement of the first density correction pattern has a halftone dot shape having a screen line number, wherein the screen line number is less than that of a second dot arrangement of the second density correction pattern.

6. The image forming device according to claim 4,
wherein a line number of the second dot arrangement is set to be greater than that of a first dot arrangement of the first density correction pattern,
wherein, when a size of a single dot of the second density correction pattern is greater than or equal to that of the first density correction pattern, a multiple line shape is used for the second dot arrangement, and
wherein, when the size of the single dot of the second density correction pattern is less than that of the first density correction pattern, a halftone dot shape is used for the second dot arrangement.

7. A density correction method executed by an image forming device, the density correction method comprising:
generating a first density correction pattern having resolution which is lower than that of a pattern which is to be used for actual image printing;
generating a second density correction pattern having high resolution, wherein the second density correction pattern is used for actual image printing;
forming one of the first density correction pattern and the second density correction pattern on an image carrier;
detecting density of the one of the first density correction pattern and the second density correction pattern, wherein the one of the first density correction pattern and the second density correction pattern is formed on the image carrier; and
comparing a first density detection value of the first density correction pattern with a predetermined threshold value,
wherein, when the first density detection value is greater than the predetermined threshold value, the density is corrected by determining a density correction reflection rate, based on the first density detection value, and
wherein, when the first density detection value is less than or equal to the predetermined threshold value, the density is corrected by determining the density correction reflection rate, based on a second density detection value of the second density correction pattern.

8. A non-transitory computer readable storage medium storing a program that causes a computer to execute a density correction method, the density correction method comprising:
generating a first density correction pattern having resolution which is lower than that of a pattern which is to be used for actual image printing;
generating a second density correction pattern having high resolution, wherein the second density correction pattern is used for actual image printing;
forming one of the first density correction pattern and the second density correction pattern on an image carrier;
detecting density of the one of the first density correction pattern and the second density correction pattern, wherein the one of the first density correction pattern and the second density correction pattern is formed on the image carrier; and
comparing a first density detection value of the first density correction pattern with a predetermined threshold value,
wherein, when the first density detection value is greater than the predetermined threshold value, the density is corrected by determining a density correction reflection rate, based on the first density detection value, and
wherein, when the first density detection value is less than or equal to the predetermined threshold value, the density is corrected by determining the density correction reflection rate, based on a second density detection value of the second density correction pattern.

* * * * *